(12) United States Patent
Salo

(10) Patent No.: US 12,704,391 B2
(45) Date of Patent: Aug. 11, 2026

(54) PROCESS ISOLATION DEVICE, A METHOD FOR INSERTING A PROCESS SENSOR PROBE INTO A PROCESS LOCATION AND A METHOD FOR REMOVING A PROCESS SENSOR PROBE FROM A PROCESS LOCATION

(71) Applicant: KXS Technologies Oy, Espoo (FI)

(72) Inventor: Harri Salo, Vantaa (FI)

(73) Assignee: KXS TECHNOLOGIES OY, Espoo (FI)

( * ) Notice: Subject to any disclaimer, the term of this patent is extended or adjusted under 35 U.S.C. 154(b) by 266 days.

(21) Appl. No.: 18/658,037

(22) Filed: May 8, 2024

(65) Prior Publication Data

US 2024/0377230 A1 Nov. 14, 2024

(30) Foreign Application Priority Data

May 9, 2023 (FI) ..................................... 20235519

(51) Int. Cl.
*G01D 11/30* (2006.01)

(52) U.S. Cl.
CPC .................................... *G01D 11/30* (2013.01)

(58) Field of Classification Search
CPC ..... G01D 11/30; G01J 1/0271; G01N 27/283; G01N 21/4133; G01N 21/8507; G01N 2021/152; G01N 1/2035; G01N 33/1886; F16M 11/04; G01B 5/0002
See application file for complete search history.

(56) References Cited

U.S. PATENT DOCUMENTS

2015/0090054 A1 4/2015 Leidner
2018/0356315 A1 12/2018 Salo
2022/0400631 A1* 12/2022 Safai .................... F16K 31/535
(Continued)

FOREIGN PATENT DOCUMENTS

WO 2021240068 A1 12/2021

OTHER PUBLICATIONS

Office Action, issued in Finnish Patent Application No. 20235519 dated Nov. 22, 2023.
(Continued)

*Primary Examiner* — David J Bolduc
(74) *Attorney, Agent, or Firm* — NIXON & VANDERHYE

(57) ABSTRACT

A process isolation device for handling a process sensor probe at a process location fitting inserts the process sensor probe into a process at a process location fitting and pulls out the process sensor probe from the process. The process isolation device includes an adapter arranged in the process location fitting and fitted for the process sensor probe to hold and move the sensor in at least three positions of the process sensor probe, the positions including the process sensor probe inserted position into the process location via the fitting into the process fluid, the process sensor probe retracted position from the processor location fitting and the process sensor probe pivoted aside position from the processor location fitting, and push-pull means in co-operation with pivot means to push and pull the process sensor probe as attached to the adapter in co-operation to pivot the process sensor probe in the adapter.

14 Claims, 5 Drawing Sheets

(56) References Cited

U.S. PATENT DOCUMENTS

Figures 1, 2:
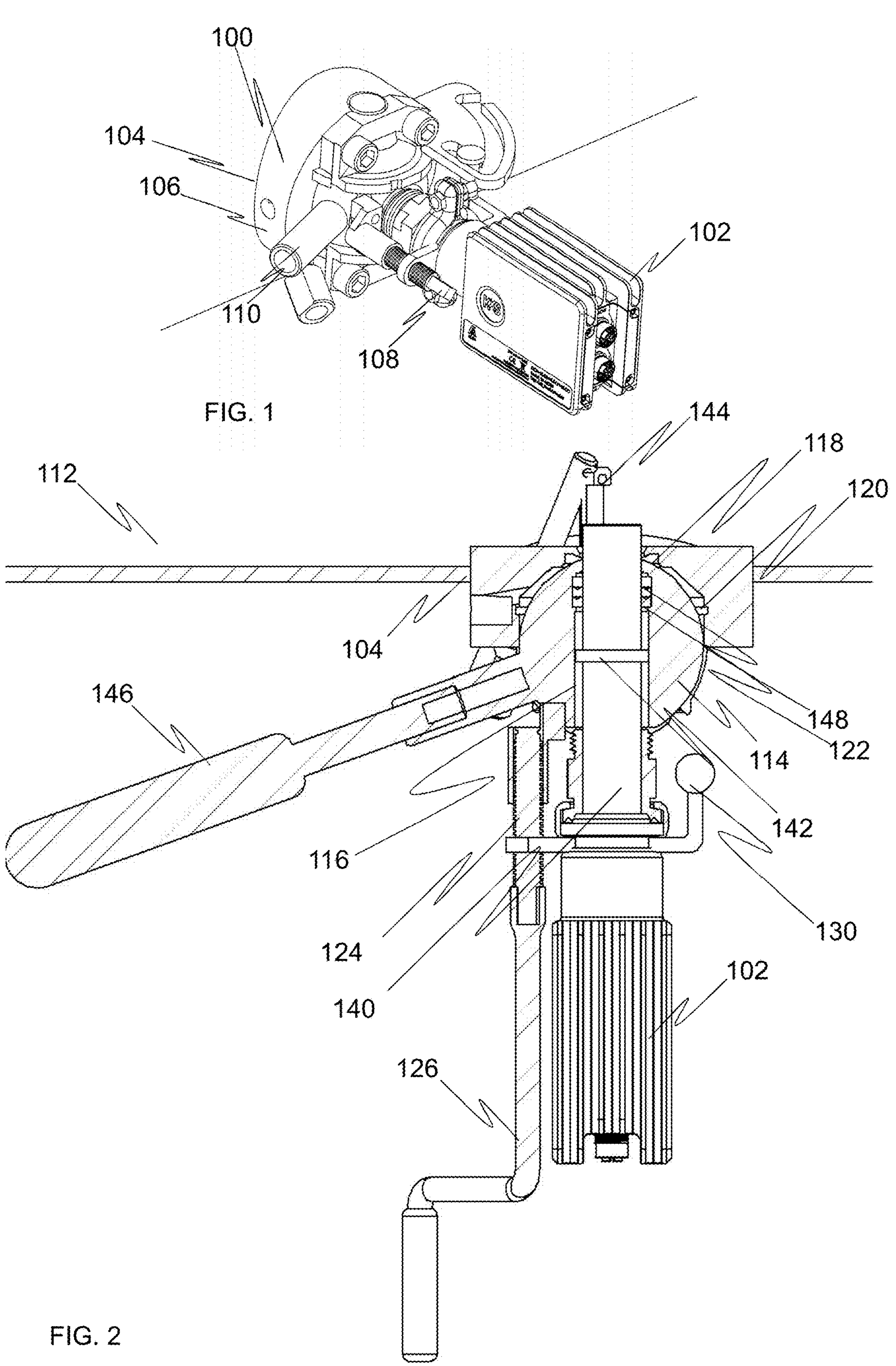

| | | | | |
|---|---|---|---|---|
| 2023/0105022 | A1 | 4/2023 | Lincoln | |
| 2023/0151847 | A1* | 5/2023 | Werries | G01D 5/145<br>403/27 |

OTHER PUBLICATIONS

Search Report, issued in Finnish Patent Application No. 20235519 dated Nov. 22, 2023.

* cited by examiner

PROCESS ISOLATION DEVICE, A METHOD FOR INSERTING A PROCESS SENSOR PROBE INTO A PROCESS LOCATION AND A METHOD FOR REMOVING A PROCESS SENSOR PROBE FROM A PROCESS LOCATION

This application claims priority to FI patent application No. 20235519 filed May 9, 2023, the entire contents of which are hereby incorporated by reference.

FIELD OF THE INVENTION

Generally, the present invention relates to a process isolation device for handling a process sensor probe at a process location fitting. More particularly, the present invention relates to inserting a process sensor probe into a process at a process location fitting and pulling out the process sensor probe from the process.

BACKGROUND

Refractometers as optical devices are based on light emitting and receiving at an interface boundary of two phases of which one is a process liquid and the other the prism of the refractometer in the duty used in the monitoring of the process liquid. The optical refraction index is measured by a refractometer directly, and when the temperature is known in the measurement location in the liquid, also the concentration of the liquid can be defined from the dependence of the refractive index on the concentration of substances in the process liquid.

Some processes are critical to the external impurities, especially in biological industry, and/or pharma, but also in other industrial fields. Sometimes the process may contain substances in two or more phases, from which there can be such present that can form slag on to the walls of the reaction vessel, but in addition to the walls, also to the other surfaces as well in the process liquid. Such slag may interfere the process monitoring by blocking the surface of a refractometer prism for example, which has to be cleaned for restoring the capability of the refractometer to measure the refractive index and the consequential concentration of the process liquid.

However, the process cannot be driven down for the wash of a particular refractometer, which kind of an event would require new settling and relaxation period to stabilize the process conditions back to the pre-existing level, with the setting the process parameters to the pre-set combination. Therefore, in the industry there has been developed devices, that can take the refractometer out of the process connection by pulling the refractometer out and clean the refractometer, especially the optical tip with the prism, and put the refractometer back to the process liquid to continue the refraction index and the consequential concentration measurement, without essential disturbance to the process or its conditions themselves.

However, the presently available devices are somewhat large and take space as well as have a heavy structure, and they are also complicated to operate. These aspects are considered somewhat difficult in manual operation, but in automation-based solutions the difficulties are highlighted even further.

SUMMARY OF THE INVENTION

The objective is to at least alleviate the problems described herein above not satisfactorily solved by the known arrangements, and to provide a feasible process isolation device for handling a process sensor probe at a process location fitting, which is small in size and does not itself cause essential disturbance to the process or its conditions.

The aforesaid objectives are achieved according to the present invention as claimed in claim 1.

Accordingly, in one aspect of the present invention a process isolation device for handling a process sensor probe at a process location fitting, the process sensor probe being inserted into a process at a process location fitting, comprises an adapter in the isolation device, the adapter being arranged in the process location fitting and being fitted for the process sensor probe to hold and move the sensor in at least three positions of the process sensor probe and so to switch between the three positions, the positions comprising the process sensor probe inserted position into the process location via the fitting into the process fluid, the process sensor probe pulled out from the processor location fitting position and the process sensor probe pivoted aside from said processor location fitting position, and a push-pull means in co-operation with pivot means to push and pull the process sensor probe as attached to the adapter in co-operation to pivot the process sensor probe in the adapter.

In one embodiment, the adapter incorporates a ball valve, enabled to pivot in the adapter, wherein the ball valve comprises a mounting hole through which the process sensor probe is pushed and/or pulled when inserted into the process location fitting and/or pulled out from the process location fitting, respectively.

In one embodiment, the process isolation device further comprises at least a first sealing and a second sealing arranged between the ball valve and the adapter to isolate the process location in any of the three positions of the process sensor probe and during the switch between the three positions.

In one embodiment, the ball valve comprises at least one sealing arranged between the mounting hole and the process sensor probe to isolate the process location.

In one embodiment, the push-pull means comprises a trapezoidal threaded rod arranged to be in connection with the adapter in such a way that the rotation of the threaded rod causes the process senor probe to be pushed and/or pulled in the adapter.

In one embodiment, the process isolation device further comprises guiding means, arranged to guide the process sensor probe into the process location fitting and/or out from the process location fitting, respectively.

In one embodiment, the guiding means comprises a guide plate, arranged in connection with the adapter, and a guide pin arranged in connection with the process sensor probe, wherein the guide plate and the guide pin are arranged to guide the process sensor probe between the three positions of the process sensor probe.

In one embodiment, the process isolation device further comprises safety means, such as a safety stopper arranged in connection with the mounting hole to stop pulling out the process sensor probe, when a predetermined length of the pulled-out process sensor probe is reached.

In one embodiment, the process isolation device further comprises a cleaning means. In an embodiment, the cleaning means comprises a scraper ring, arranged in connection with the mounting hole to clean the outer surface of the process sensor probe. The cleaning means are advantageous for cleaning slag from the outer surface of the process sensor probe, when inserted into or retracted from a process location, and thus to protect the sealing(s) arranged in the mounting hole.

In one embodiment, the cleaning means comprises a steam wash nozzle, arranged to clean the process sensor probe, when arranged in the inserted position or in the pivoted aside position. The steam wash nozzle can be used to clean the process sensor probe in the process location and/or before retracting the process sensor probe from the process location for detaching possible slag from the surface of the process sensor probe.

Yet, in another embodiment, the process isolation device further comprises automated means in connection with the push-pull means and/or the pivot means arranged to enable automated switching between the three positions of the process sensor probe.

In another aspect of the present invention, a method for inserting a process sensor probe into a process location comprises at least the steps of

- introducing the process sensor probe into a mounting hole to be in a pivoted aside position
- pivoting a ball valve by pivot means for switching the process sensor probe from the pivoted aside position to a retracted position,
- pushing the process sensor probe by push-pull means for switching the process sensor probe from the retracted position to an inserted position.

Yet, in another aspect of the present invention, a method for removing a process sensor probe from a process location comprises at least the steps of

- pushing the process sensor probe by push-pull means for switching the process sensor probe from an inserted position to a retracted position, and
- pivoting a ball valve by pivot means for switching the process sensor probe from the retracted position to a pivoted aside position.

In an embodiment, the method for removing a process sensor probe from a process location comprises a further step of cleaning the process sensor probe in the pivoted aside position.

The utility of the present invention follows from a plurality of factors depending on each particular embodiment. The present invention is safe and easy to use. It is also small in size, lightweight and does not itself cause essential disturbance to the process or its conditions.

The present invention can also simplify the handling of the process sensor probe at a process location fitting, which may enable automatic handling of the process sensor probe, which can bring significant time savings to process handling.

The sealings between the ball valve and the adapter as well as between the mounting hole and the process sensor probe according to some embodiments may secure and ensure the insulation of the process location in any positions of the process sensor probe.

The present invention also enables solutions, wherein cleaning of the process sensor probe is carried out in retracted position and the sensor does not need to be removed from the mounting hole for cleaning. This can be especially useful for pH sensors, for example.

The skilled person understands that the term "process sensor probe" refers herein to any possible sensor probe, which can be inserted into a process at a process location fitting, and refractometers are used as an example, not limiting.

The term "retracted" refers herein to the position of the process sensor probe, wherein the process sensor probe is arranged in the mounting hole and before it is pushed into the process location or after it is pulled out from the process location.

The expression "a number of" refers herein to any positive integer starting from one (1), e.g. to one, two, or three.

The expression "a plurality of" refers herein to any positive integer starting from two (2), e.g. to two, three, or four.

Different embodiments of the present invention are disclosed in the dependent claims.

BRIEF DESCRIPTION OF THE RELATED DRAWINGS

Figure 3:
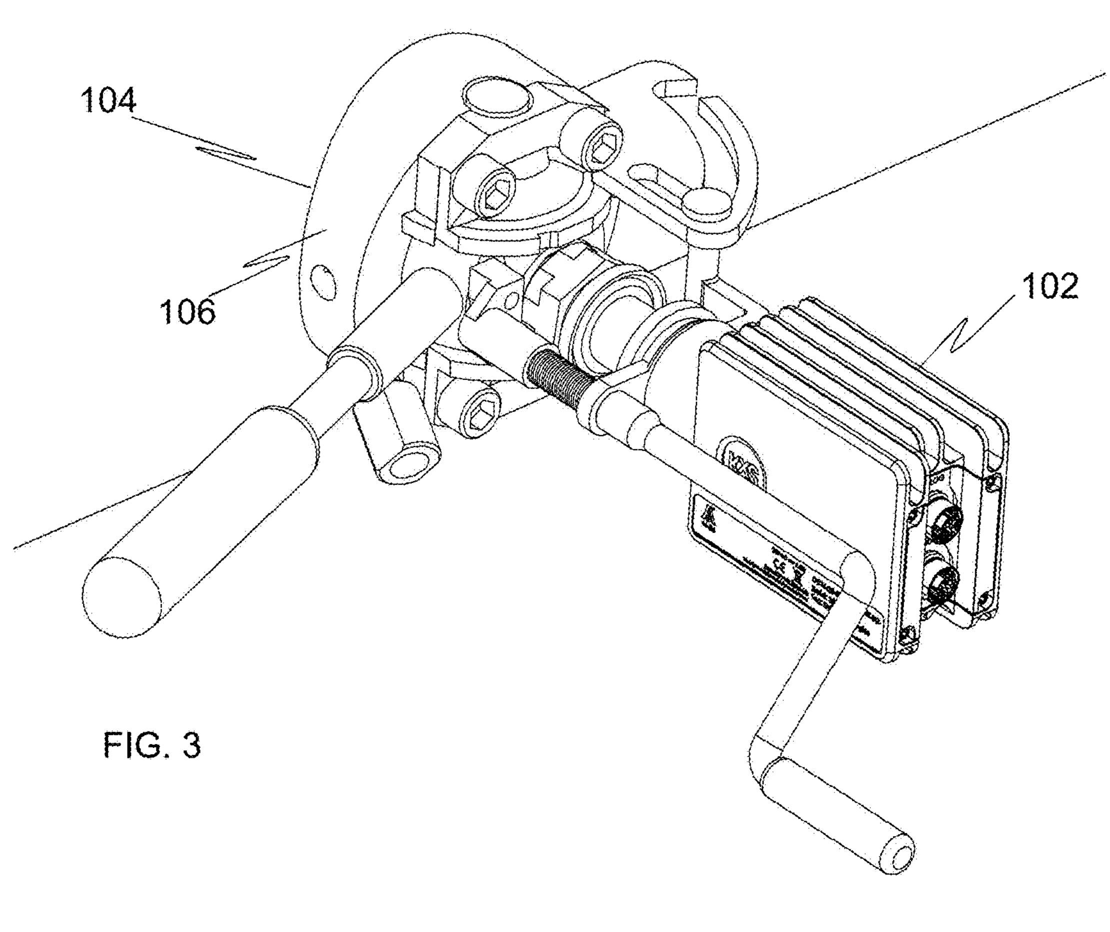
Figure 4:
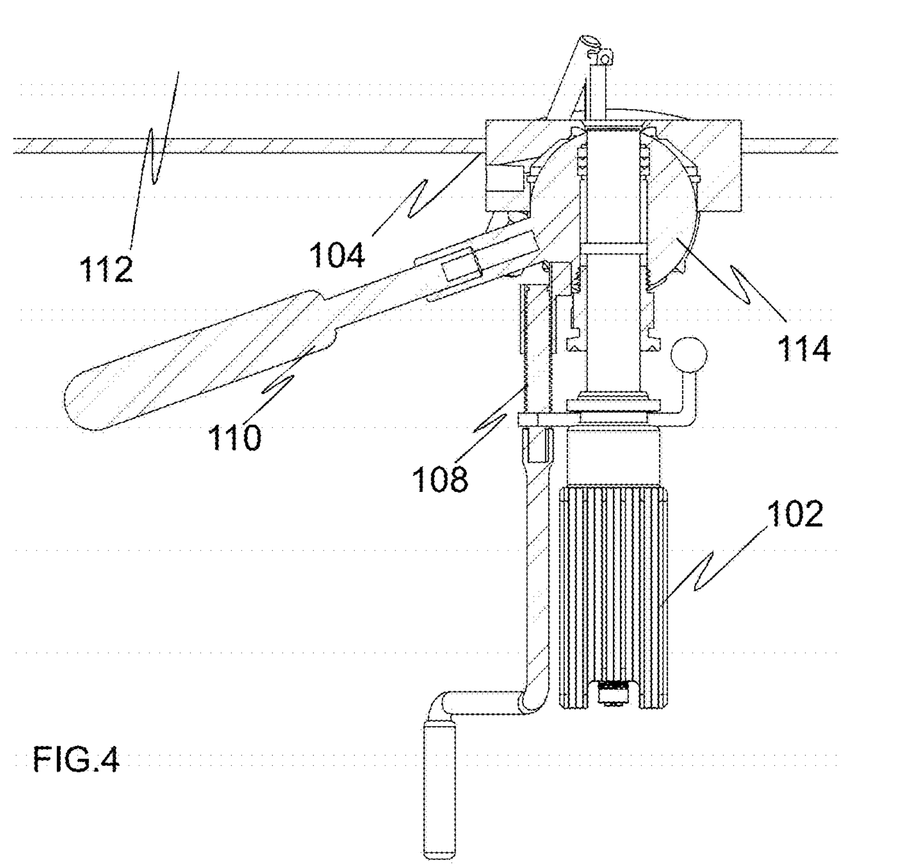
Figure 5:
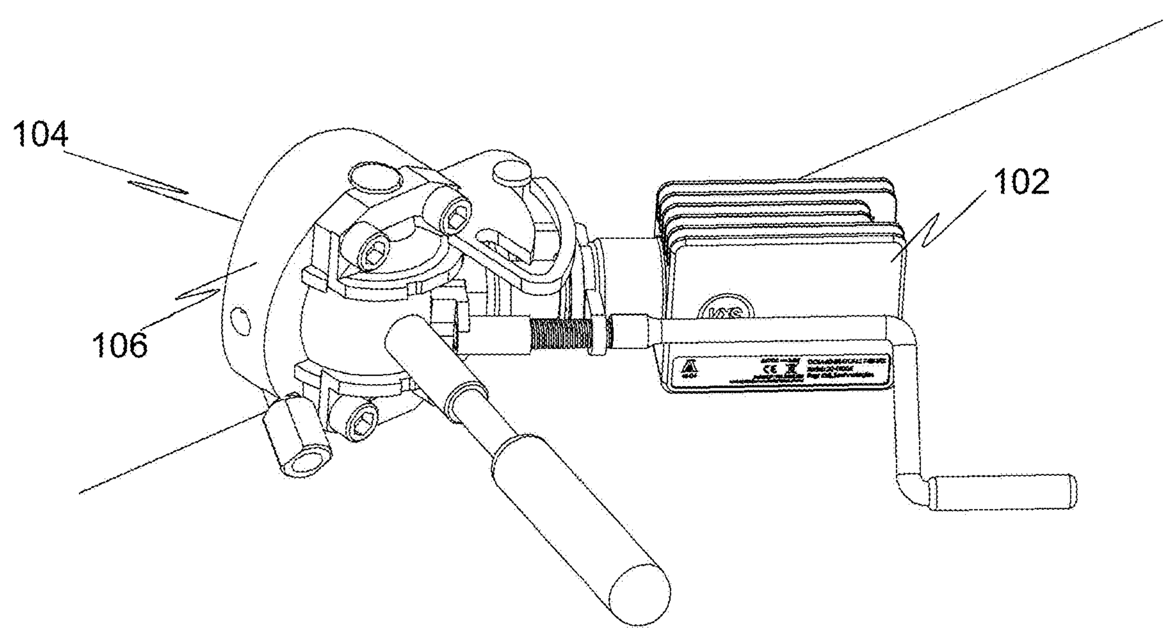
Figure 6:
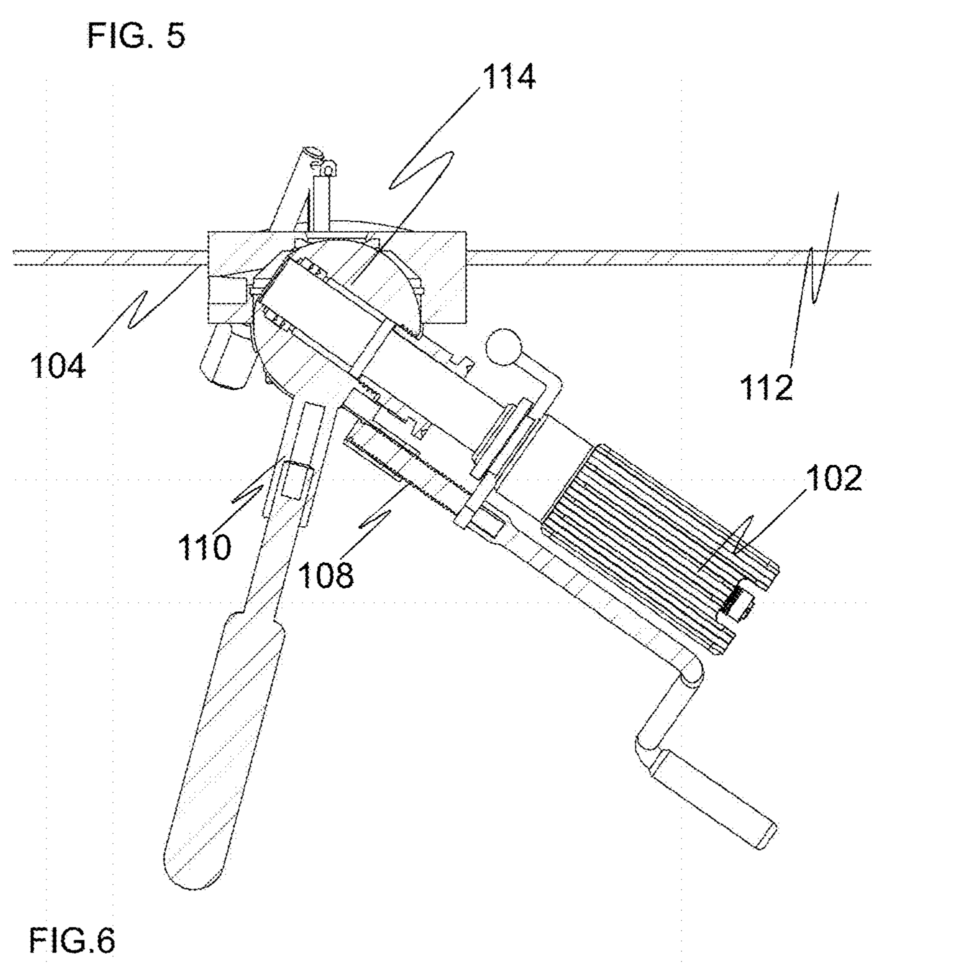
Figure 7:
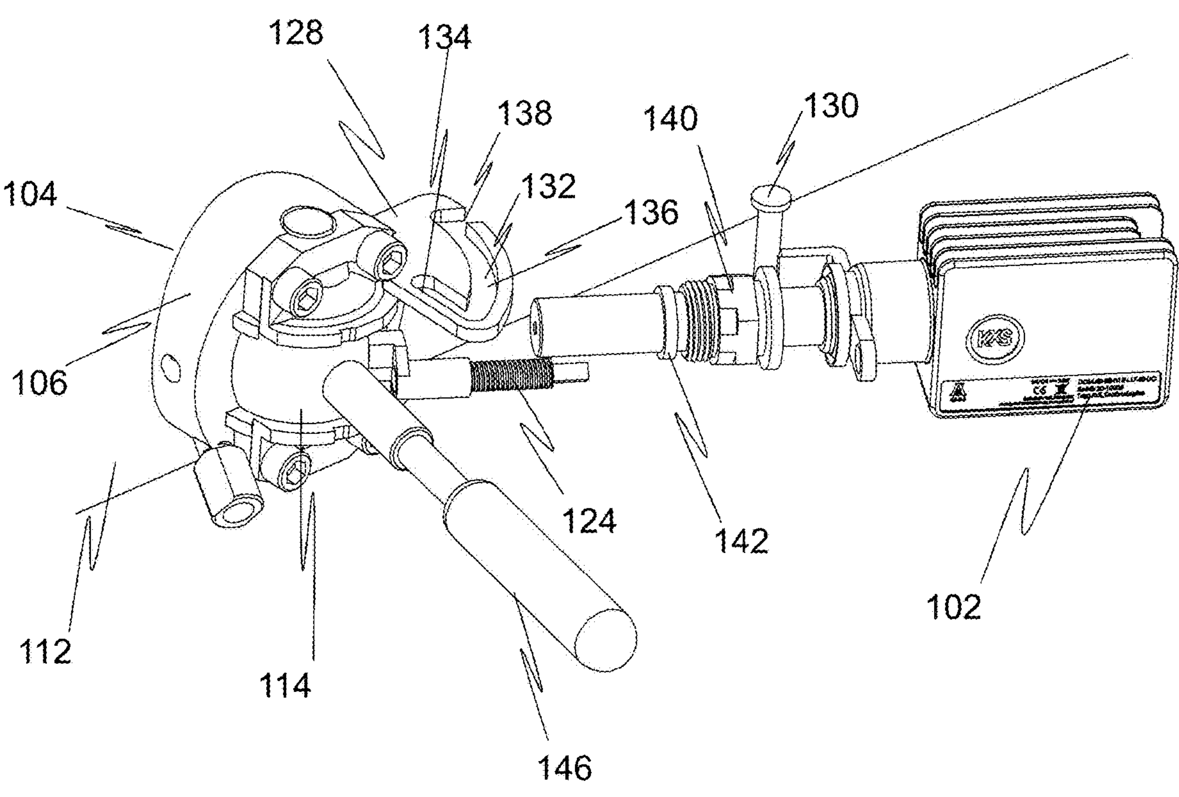
Figure 8:
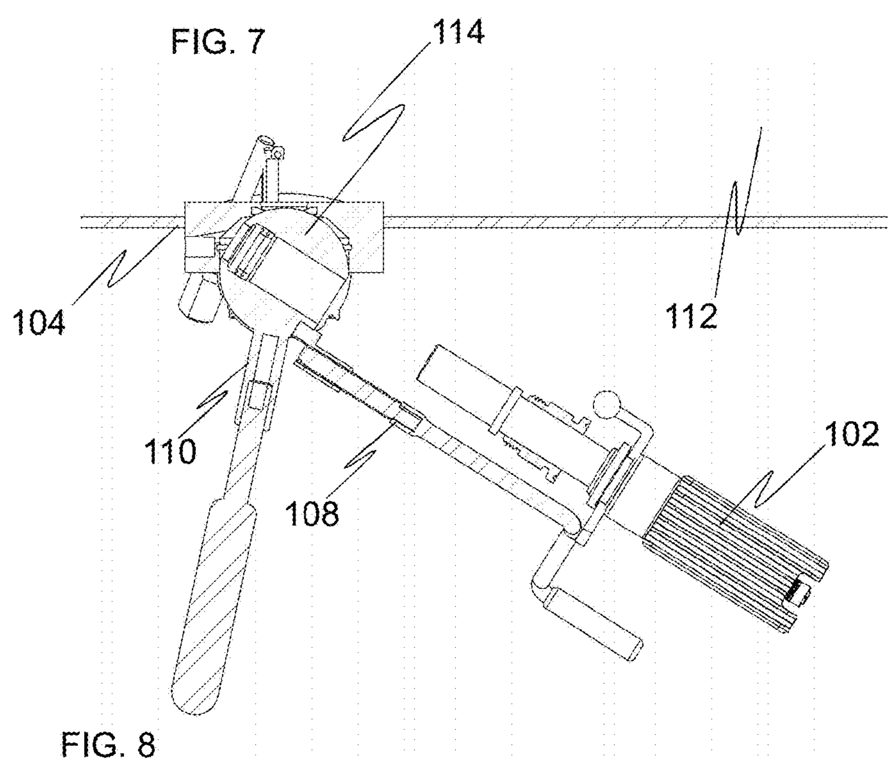
Figures 9, 10:
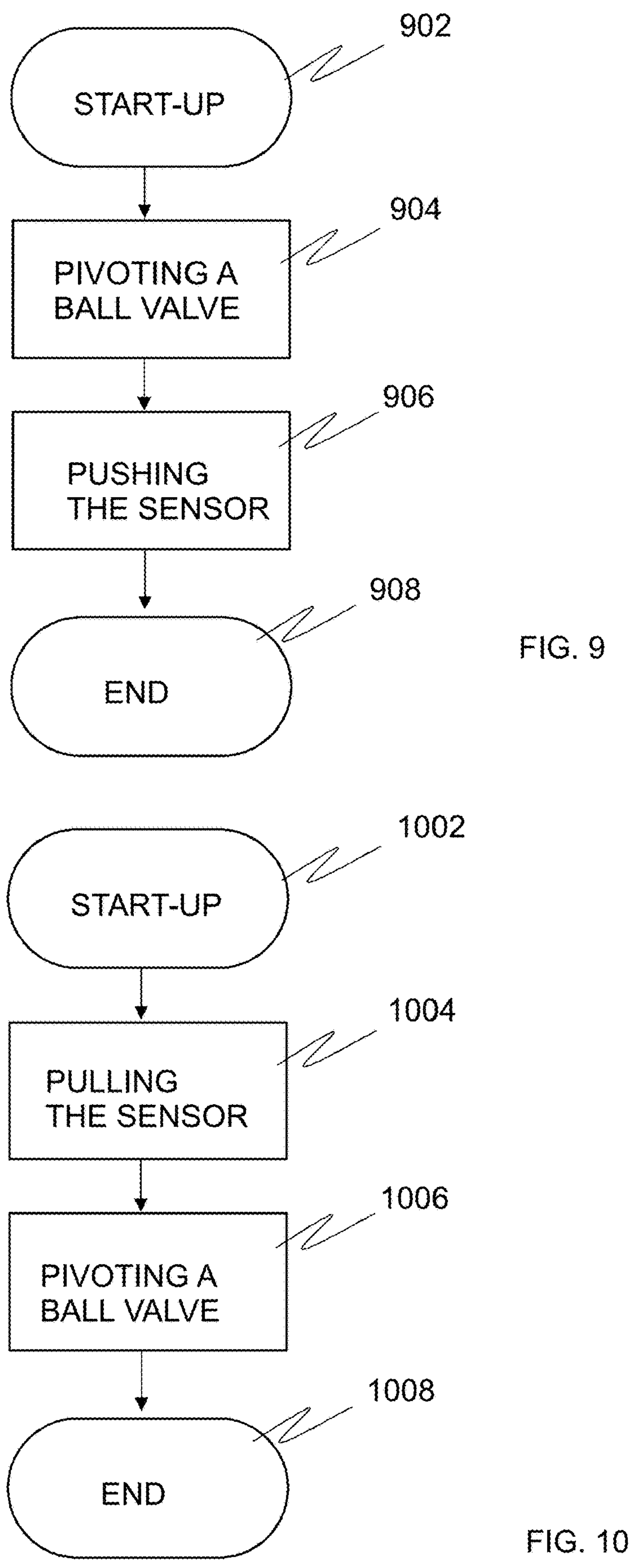

Next the invention is described in more detail with reference to the appended drawings in which FIG. 1 illustrates a perspective view of an exemplary embodiment of a process isolation device in accordance with the present invention in operational mode, the process sensor probe in an inserted position in the process location fitting, FIG. 2 illustrates a top, sectional view of the process isolation device in FIG. 1, FIG. 3 illustrates a perspective view of an exemplary embodiment of a process isolation device in accordance with the present invention, the process sensor probe in retracted position from said processor location fitting, FIG. 4 illustrates a top, sectional view of the process isolation device in FIG. 3, FIG. 5 illustrates a perspective view of an exemplary embodiment of a process isolation device in accordance with the present invention, the process sensor probe in pivoted aside position from said processor location fitting, FIG. 6 illustrates a top, sectional view of the process isolation device in FIG. 5, FIG. 7 illustrates a perspective view of an exemplary embodiment of a process isolation device in accordance with the present invention, the process sensor probe being illustrated separately from the process isolation device, FIG. 8 illustrates a top, sectional view of the process isolation device in FIG. 7, FIG. 9 is a flow diagram of an embodiment of a method for introducing a process sensor probe into a process location in accordance with the present invention.

FIG. 10 is a flow diagram of an embodiment of a method for removing a process sensor probe from a process location in accordance with the present invention.

DETAILED DESCRIPTION OF THE EMBODIMENTS

FIG. 1 illustrates a perspective view of an exemplary embodiment of a process isolation device in accordance with the present invention in an operational mode, the process sensor probe being in an inserted position in the process location fitting, and FIG. 2 is a top, sectional view of the process isolation device in FIG. 1.

A process isolation device 100 for handling a process sensor probe 102 at a process location fitting 104 comprises an adapter 106 in the isolation device 100, a push-pull means 108 and pivot means 110.

The adapter 106 is arranged in the process location fitting 104 and is fitted for the process sensor probe 102 to hold and move the process sensor probe 102 in at least three positions of the process sensor probe 102 and so to switch between the three positions, the three positions of the process sensor probe 102 being in an inserted position in the process location fitting 104 (FIGS. 1 and 2), in retracted position from the processor location fitting 104 (FIGS. 3 and 4), and in pivoted aside position from said processor location fitting 104 (FIGS. 5 and 6).

FIG. 7 illustrates a perspective view of an exemplary embodiment of a process isolation device in accordance with the present invention, where the process sensor probe is depicted separately from the process isolation device, and FIG. 8 is a top, sectional view of the process isolation device in FIG. 7. However, especially the inner components of various the embodiments are best shown in FIG. 2.

In an embodiment, the adapter 106 incorporates a ball valve 114, which is enabled to pivot in the adapter 106. The skilled person understands that the surface of the adapter against the ball valve is preferably arranged to match the shape of the ball valve. However, adapters with a ball valve in a process location fitting are well known technique in the prior art and are not described further detail in this document.

The ball valve 114 comprises a mounting hole 116 through which the process sensor probe 102 is pushed and/or pulled when inserted into the process location fitting 104 and/or pulled out from the process location fitting 104, respectively. Advantageously the shape and the size of the mounting hole 116 corresponds to the shape and the size of the process sensor probe 102.

In an embodiment, the process isolation device 100 further comprises at least a first sealing 118 and a second sealing 120 arranged between the ball valve 114 and the adapter 106. The purpose of the first and the second sealings is to isolate a process location 112 in any of the three positions of the process sensor probe 102 and during the switch between the positions.

The first sealing 118 is preferably arranged between the ball valve 114 and the adapter 106 in a location that is the closest of the process location. The second sealing 120 is arranged further from the process location so that the second sealing 120 isolates the process location when switching the process sensor probe 102 between the retracted position and pivoted aside position.

In an embodiment, the ball valve 114 comprises at least a first sealing 148 arranged between the mounting hole 116 and the process sensor probe 102. The first mounting hole sealing 148 is preferably arranged at the top part of the mounting hole 116 in such a way that the mounting hole 116 and the process sensor probe 102 isolate the process location 112 in every position of the process sensor probe 102.

In another embodiment, the ball valve 114 comprises a second sealing (not shown) arranged between the mounting hole 116 and the process sensor probe 102. In an embodiment, the second sealing, such as a o-ring, for example, is arranged in connection with a sensor nut 140, which is typically used for ensuring the connection between the process sensor probe 102 and the adapter 106.

Yet, in an embodiment, the process isolation device 100 further comprises a cleaning means.

In an embodiment, the cleaning means comprises a scraper ring 122, arranged in connection with said mounting hole 116. The person skilled in the art understands that the scraper ring 122 is advantageously arranged in connection with the mounting hole sealing 148 and preferably it is arranged in front of the mounting hole sealing 148. The scraper ring 122 is arranged to clean the outer surface of the process sensor probe 102, when pushed into and/or pulled out from the process location 112, and thus arrange to protect the mounting hole sealing 148.

In an embodiment, the cleaning means comprises a steam wash nozzle 144, arranged to clean the process sensor probe 102, when the process sensor probe 102 is inserted into the process location.

Yet, in an embodiment, the cleaning means comprises wash nozzle (not shown) arranged to clean the process sensor probe 102, when the process sensor probe 102 is in pivoted aside position.

In an embodiment, the push-pull means 108 comprises a trapezoidal threaded rod 124 arranged to be in connection with the adapter 106 in such a way that the rotation of the threaded rod 124 causes the process senor probe 102 to be pushed and/or be pulled in the adapter 106.

The length of the trapezoidal threaded rod 124 must be selected to enable to retract the process sensor probe 102 out from the process location 112 and out from the first sealing 118, and thus enable the pivotal movement of the ball valve with the process senor probe 102.

The skilled person understands that the push-pull means can be arranged in various way, and the trapezoidal threaded rod is disclosed as an example of the push-pull means, not limited thereto.

In an embodiment, the process isolation device 100 further comprises safety means, such as a safety stopper 142, arranged in connection with the mounting hole 116 to stop pulling out the process sensor probe 102, when a predetermined length of the pulled-out process sensor probe is reached. In an embodiment, the safety stopper 142 has a form of the ring and its length is selected to physically stop the trapezoidal threaded rod 124 from pulling out the process sensor probe.

In an embodiment, the predetermined length of the pulled-out process sensor probe is selected to be reached when the process sensor probe 102 is out from the process location 112 and out from the first sealing 118, but still inside of the mounting hole sealing 148, thus ensuring the isolation of the process location.

The safety stopper 142 is advantageously arranged around the process sensor probe 102, when introducing the process sensor probe 102 in the adapter. In an embodiment, the safety stopper is ensured in its location by the sensor nut 140.

In an embodiment, the push-pull means 108 further comprises a crank 126, which can be attachable/detachable depending on an embodiment for manually pushing and/or pulling the process senor probe 102 in the adapter 106.

In another embodiment, the push-pull means 108 are connected with automated means for pushing and/or pulling the process senor probe 102 in the adapter 106.

In an embodiment, the pivot means 110 are arranged in connection with the ball valve 114 for pivoting the process senor probe 102 aside from the process location fitting 104 or from the aside position to the retracted position in the process location fitting 104.

In an embodiment, the pivot means 110 further comprises a handle 146, which can be attachable/detachable depending on an embodiment for manually pivoting the ball valve 114 in the adapter 106.

In another embodiment, the pivot means 110 are connected with automated means for pivoting the ball valve 114 in the adapter 106.

In an embodiment, the process isolation device further comprises guiding means arranged to guide the process sensor probe into the process location fitting and/or out from the process location fitting, respectively.

In another embodiment, the guiding means comprises a guide plate 128, which is arranged in connection with the adapter 106, and a guide pin 130, which is arranged in connection with the process sensor probe 102.

As can be best seen in FIG. 7, the guide plate advantageously comprises a groove 132 that is formed to control the movement of the sensor between different positions with the help of the guide pin 130. In an embodiment, the groove comprises a retracting part 134 for guiding pushing of the process sensor probe 102 into the process location fitting 112 and/or pulling out from the process location fitting 112, and a pivotal part 136 for guiding pivoting the ball valve 114 with the retracted process sensor probe 102 in the mounting hole 116.

Advantageously, the guide plate also comprises an opening 138 for the guide pin 130 to introduce the guide pin in the guide plate or detaching from it.

In the embodiments depicted in FIGS. 1-8, the guide plate 128 is arranged above the ball valve 114, but the skilled person understands that the guide plate can be arranged in some other way, too.

The guide pin 130 can be connected with the process sensor probe 102 in various ways. In an embodiment, the guide pin comprises a ring part, which is arranged around the process sensor probe 102. In another embodiment, the guide pin is arranged in connection with the sensor nut 140.

FIG. 9 is a flow diagram of an embodiment of a method for introducing a process sensor probe into a process location in accordance with the present invention.

At method start-up 902, preparatory actions may take place. Depending on an embodiment, the preparatory actions comprise actions such as, but not limited to inserting a sensor nut, a guide pin and/or a safety stopper in connection with a process sensor probe, connecting the process sensor probe into a mounting hole of an adapter and introducing the guide pin into a groove of a guiding plate. After the preparatory actions the process sensor probe is in a pivoted aside position. At 904, pivoting a ball valve by pivot means for switching the process sensor probe from the pivoted aside position to a retracted position. The guide pin follows a pivoting part of a groove in a guiding plate for ensuring the right track of the ball valve.

At 906, pushing the process sensor probe by push-pull means until the process sensor probe has been inserted into the process location via the fitting into the process fluid. The length of a trapezoidal threaded rod of the push-pull means can be selected to correspond to the required length of the process sensor probe needed to be pushed in the mounting hole to ensure insertion of the process sensor probe into the process location.

At 910, the method execution is ended.

FIG. 10 is a flow diagram of an embodiment of a method for removing a process sensor probe from a process location in accordance with the present invention.

At method start-up 1002, preparatory actions may take place. Depending on an embodiment, the preparatory actions comprise actions such as, but not limited to preparing push-pull means and pivot means pull the process sensor probe.

Depending on an embodiment, a crank and/or a handle is/are attached to the push-pull means and/or pivot means, or a command is sent to automated means arranged in connection with the push-pull means and/or pivot means.

At 1004, pulling out the process sensor probe by push-pull means until the process sensor probe has been retracted from the process location via the fitting.

Preferably, pulling the process sensor probe is continued until the process sensor probe is out from the first sealing, but still inside of the mounting hole sealing, thus ensuring the isolation of the process location.

At 1006, pivoting a ball valve by pivot means for switching the process sensor probe from a retracted position to a pivoted aside position. The guide pin follows a pivoting part of a groove in a guiding plate for ensuring the right track of the ball valve.

At 1008, the method execution is ended, and the process sensor probe can be removed from the mounting hole.

In an embodiment, the method for removing a process sensor probe from a process location comprises a further step of cleaning the process sensor probe in the pivoted aside position. The process sensor probe can be then introduced into the process location via the fitting by using the method for introducing a process sensor probe into a process location described above.

Consequently, a skilled person may on the basis of this disclosure and general knowledge apply the provided teachings in order to implement the scope of the present invention as defined by the appended claims in each particular use case with necessary modifications, deletions, and additions.

The invention claimed is:

1. A process isolation device for handling a process sensor probe at a process location fitting, characterized in that, the process isolation device comprises an adapter in said isolation device, said adapter being arranged in the process location fitting and being fitted for the process sensor probe to hold and move the sensor in at least three positions of the process sensor probe and so to switch between said three positions, the positions comprising the process sensor probe inserted position into the process location via the fitting into the process fluid, the process sensor probe retracted position from said processor location fitting and the process sensor probe pivoted aside position from said processor location fitting, push-pull means in co-operation with pivot means to push and pull the process sensor probe as attached to the adapter in co-operation to pivot the process sensor probe in said adapter.

2. The process isolation device according to claim 1, wherein said adapter incorporates a ball valve, enabled to pivot in said adapter, wherein the ball valve comprises a mounting hole through which the process sensor probe is pushed and/or pulled when inserted into the process location fitting and/or pulled out from the process location fitting, respectively.

3. The process isolation device according to claim 2, wherein said process isolation device further comprises at least a first sealing and a second sealing arranged between said ball valve and said adapter to isolate the process location in any of said three positions of the process sensor probe and during the switch between said positions.

4. The process isolation device according to claim 2, wherein said ball valve comprises at least one sealing arranged between said mounting hole and the process sensor probe to isolate the process location with the process sensor probe.

5. The process isolation device according to claim 1, wherein said push-pull means comprises a trapezoidal threaded rod arranged to be in connection with said adapter in such a way that the rotation of said threaded rod causes the process senor probe to be pushed and/or pulled in said adapter.

6. The process isolation device according to claim 1, wherein said process isolation device further comprises guiding means, such as a guide plate and guide pin, wherein said guiding means are arranged to guide the process sensor probe into the process location fitting and/or out from the process location fitting, respectively.

7. The process isolation device according to claim 1, wherein said process isolation device further comprises safety means, such as a safety stopper, arranged in connection with said mounting hole to stop pulling out the process sensor probe, when a predetermined length of the pulled-out process sensor probe is reached.

8. The process isolation device according to claim 1, wherein said process isolation device further comprises a cleaning means to clean the process sensor probe.

9. The process isolation device according to claim 8, wherein said cleaning means comprises a scraper ring, arranged in connection with said mounting hole, to clean the outer surface of the process sensor probe.

10. The process isolation device according to claim 8, wherein said cleaning means comprises a steam wash nozzle arranged to clean the process sensor probe, when arranged in the inserted position or pivoted aside position.

11. The process isolation device according to claim 1, wherein said process isolation device further comprises automated means arranged in connection with said push-pull means and/or said pivot means to enable automated switching between said three positions of the process sensor probe.

12. A method for inserting a process sensor probe into a process location comprising a process isolation device according to claim 1, the method comprises at least the steps of introducing the process sensor probe into a mounting hole to be in a pivoted aside position, pivoting a ball valve by pivot means for switching the process sensor probe from the pivoted aside position to a retracted position, pushing the process sensor probe by push-pull means for switching the process sensor probe from the retracted position to an inserted position.

13. A method for removing a process sensor probe from a process location comprising a process isolation device according to claim 1, the method comprises at least the steps of pushing the process sensor probe by push-pull means for switching the process sensor probe from an inserted position to a retracted position, pivoting a ball valve by pivot means for switching the process sensor probe from the retracted position to a pivoted aside position.

14. The method according to claim 12 further comprises a step of cleaning the process sensor probe in the pivoted aside position.

* * * * *